(12) United States Patent
Winstead et al.

(10) Patent No.: US 6,871,617 B1
(45) Date of Patent: Mar. 29, 2005

(54) METHOD OF CORRECTING VALVE TIMING IN ENGINE HAVING ELECTROMECHANICAL VALVE ACTUATION

(75) Inventors: Vince Winstead, Farmington Hills, MI (US); Ilya V. Kolmanovsky, Ypsilanti, MI (US); Nate Trask, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/754,412

(22) Filed: Jan. 9, 2004

(51) Int. Cl.$^7$ ................................................. F01L 9/04
(52) U.S. Cl. ................................ 123/90.11; 123/90.15
(58) Field of Search ........................... 123/90.11, 90.15, 123/90.16, 90.17, 90.31

(56) References Cited

U.S. PATENT DOCUMENTS

| | | | |
|---|---|---|---|
| 4,779,528 A | 10/1988 | Bruke | |
| 4,926,823 A | 5/1990 | Kishi et al. | |
| 4,965,741 A | 10/1990 | Winchell et al. | |
| 5,236,332 A | 8/1993 | Satou et al. | |
| 5,280,770 A | 1/1994 | Satou et al. | |
| 5,345,914 A | * 9/1994 | Tang ........................... | 123/478 |
| 5,422,811 A | 6/1995 | Togai | |
| 5,515,828 A | 5/1996 | Cook et al. | |
| 5,548,514 A | 8/1996 | Hasegawa et al. | |
| 5,600,056 A | 2/1997 | Hasegawa et al. | |
| 5,647,312 A | 7/1997 | Salber et al. | |

(Continued)

FOREIGN PATENT DOCUMENTS

| | | |
|---|---|---|
| EP | 1 054 148 | 5/2000 |
| JP | S55-29002 | 3/1980 |
| JP | S55-49549 | 4/1980 |

OTHER PUBLICATIONS

Ronald J. Pierik et al, "Design and Development of a Mechanical Variable Valve Actuation System", SAE Technical Paper No. 2001–01–1221, Mar. 6–9, 2000, pp. 1–8.
Martin Pischinger et al, "Benefits of the Electromechanical Valve Train in Vehicle Operation", SAE Technical Paper No. 2000–01–1223, Mar. 6–9, 2000, pp. 1–11.
M.J. Van Nieuwstadt et al, "Air Change Estimation in Camless Engines", SAE Technical Paper No. 2001–01–0581, Mar. 5–8, 2001, pp. 1–8.
Lucien Koopmans et al, "A four Stroke Camless Engine, Operated in Homogeneous Charge Compression Ignition Mode with Commercial Gasoline", SAE Technical Paper No. 2001–01–3610, Sep. 24–27, 2001, pp. 1–14.
Wolfgang Salber et al, "Synergies of Variable Valve Actuation and Direct Injection", SAE Technical Paper No. 2002–01–0706, Mar. 4–7, 2002, pp. 1–9.
"Operation of the Electronic Valve Actuation, Ford EVA Project Closed Loop Engine, System Control", Manual— Preliminary Version III, Mar. 21, 2003, and in particular pp. 6, 72, 80–84, 89–95, 104–119, and 134–218.

*Primary Examiner*—Thomas Denion
*Assistant Examiner*—Zelalem Eshete
(74) *Attorney, Agent, or Firm*—Allan J. Lippa; Alleman Hall McCoy Russell & Tuttle LLP

(57) ABSTRACT

A method to compute, store, and inject adaptive valve timing corrections in a camless valvetrain architecture where a measurable (based on the resolution of the measuring methodology) error exists between the requested and delivered valve timing. This method is based on a measurement of the delivered valve timing, such as from a direct position sensor, (hall effect, LVDT, optical, etc.) or inferred position sensing based on valve actuator current (electronic actuation) or pressure (hydraulic actuation) feedback. This measured delivered valve timing information is used to compute offsets which, when applied to the desired timing, provide more accurate correlation between the delivered timing and the desired timing.

19 Claims, 4 Drawing Sheets

U.S. PATENT DOCUMENTS

| | | |
|---|---|---|
| 5,669,341 A | 9/1997 | Ushirono et al. |
| 5,678,402 A | 10/1997 | Kitagawa et al. |
| 5,743,221 A | 4/1998 | Schmitz |
| 5,746,183 A | 5/1998 | Parke et al. |
| 5,765,514 A | 6/1998 | Sono et al. |
| 5,826,551 A * | 10/1998 | Janse van Vuuren .... 123/90.12 |
| 5,950,603 A | 9/1999 | Cook et al. |
| 6,000,376 A | 12/1999 | Hess et al. |
| 6,023,929 A | 2/2000 | Ma |
| 6,039,026 A | 3/2000 | Shiraishi et al. |
| 6,098,585 A | 8/2000 | Brehob et al. |
| 6,116,210 A | 9/2000 | Oder et al. |
| 6,138,636 A | 10/2000 | Kohno et al. |
| 6,219,611 B1 | 4/2001 | Russell |
| 6,247,445 B1 | 6/2001 | Langer |
| 6,276,316 B1 | 8/2001 | Arai et al. |
| 6,332,446 B1 | 12/2001 | Matsumoto et al. |
| 6,336,355 B1 | 1/2002 | Sasaki et al. |
| 6,341,584 B1 | 1/2002 | Itoyama et al. |
| 6,349,541 B1 | 2/2002 | Gruden et al. |
| 6,374,813 B1 | 4/2002 | Iida et al. |
| 6,386,156 B1 | 5/2002 | Stockhausen et al. |
| 6,390,063 B1 | 5/2002 | Obata et al. |
| 6,408,806 B2 | 6/2002 | Sugiyama et al. |
| 6,425,369 B2 | 7/2002 | Arai et al. |
| 6,431,129 B1 | 8/2002 | Hammoud et al. |
| 6,431,130 B1 | 8/2002 | Leone et al. |
| 6,443,108 B1 | 9/2002 | Brehob et al. |
| 6,453,662 B1 | 9/2002 | Lewis et al. |
| 6,453,665 B1 | 9/2002 | Bower, Jr. et al. |
| 6,457,465 B2 | 10/2002 | Lee |
| 6,470,853 B1 | 10/2002 | Leone et al. |
| 6,311,667 B1 | 11/2002 | Leone et al. |
| 6,474,303 B1 | 11/2002 | Leone et al. |
| 6,481,201 B2 | 11/2002 | Kako et al. |
| 6,484,677 B2 | 11/2002 | Leone et al. |
| 6,488,008 B1 * | 12/2002 | Jankovic et al. ............ 123/399 |
| 6,497,093 B1 | 12/2002 | Lewis et al. |
| 6,502,389 B2 | 1/2003 | Katayama et al. |
| 6,513,493 B1 | 2/2003 | Russell et al. |
| 6,532,944 B1 | 3/2003 | Leone et al. |
| 6,550,434 B2 | 4/2003 | Leone et al. |
| 6,557,505 B1 | 5/2003 | Hori |
| 6,568,177 B1 | 5/2003 | Surnilla |
| 6,591,605 B2 | 7/2003 | Lewis |
| 6,619,262 B2 | 9/2003 | Graf et al. |
| 6,629,409 B2 | 10/2003 | Lewis et al. |
| 6,640,756 B2 | 11/2003 | Ogiso |
| 2002/0096139 A1 | 7/2002 | Zheng |
| 2003/0015026 A1 | 1/2003 | Chung |

* cited by examiner

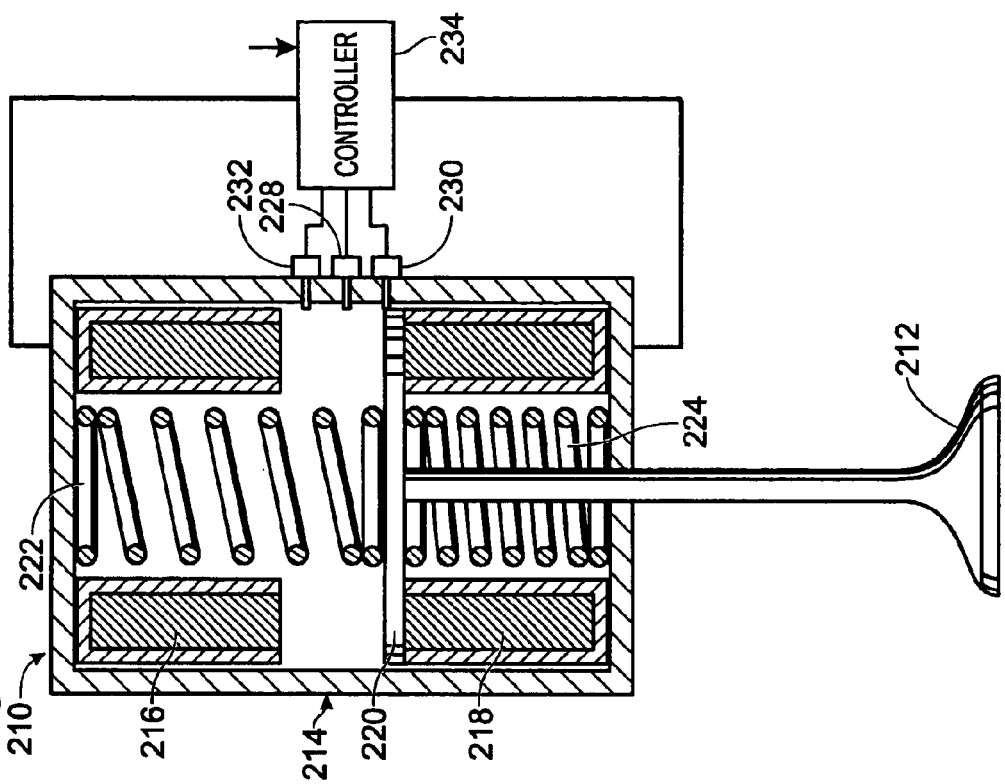
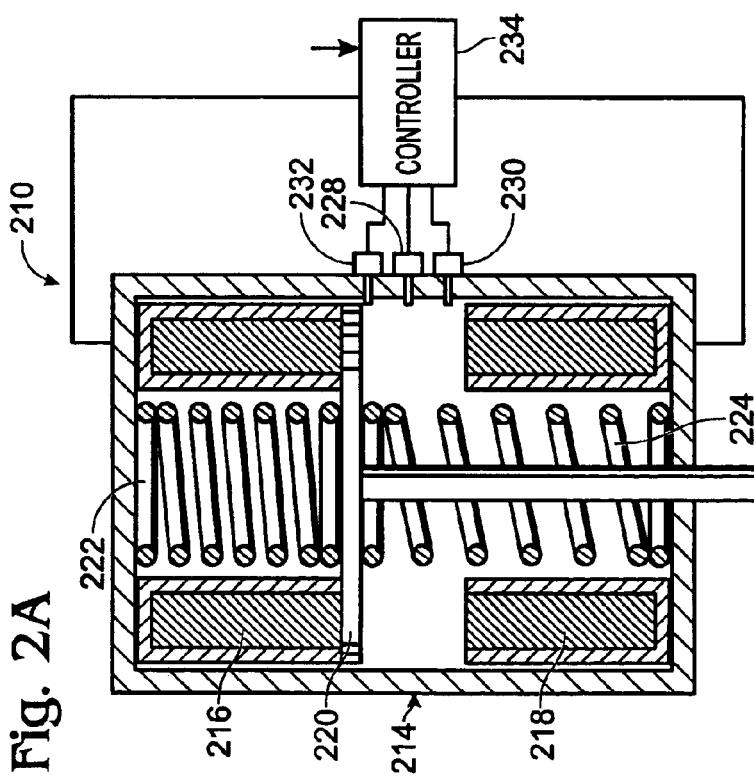

METHOD OF CORRECTING VALVE TIMING IN ENGINE HAVING ELECTROMECHANICAL VALVE ACTUATION

FIELD OF THE INVENTION

The present invention relates generally to systems for correcting valve timing measurements and control in a camless engine.

BACKGROUND AND SUMMARY OF THE INVENTION

Electric valve actuation can be used in internal combustion engine to provide increased flexibility in terms of valve timing and/or lift, rather than being constrained by camshaft actuation.

The inventors herein have recognized disadvantages with such systems in certain operating condition. Specifically, in some systems, the valve control that provides the desired valve timing is executed with some error during specific operating conditions. Likewise, in valve lift systems, the control that provides the desired lift can also be executed with some error during specific operating conditions. Also, this error can vary widely depending on the operating conditions. Furthermore, by the time this error is measured, or inferred, and used to correct the valve actuation, the cylinder event is already completed, or nearly completed. As such, it is generally available too late to be used to adjust valve timing for that cylinder event to reduce the error.

The above disadvantages are overcome by a system comprising:

an electrically actuated valve of an internal combustion engine;

a computer storage medium having instructions encoded therein for controlling said electrically actuated valve, said medium comprising:

code for determining a desired valve condition for a cylinder cycle;

code for determining an actual valve condition occurring during said cylinder cycle;

code for determining an error between said desired valve condition and said actual valve condition for said cylinder cycle; and code for adjusting a desired valve condition of a subsequent cylinder cycle based on said determined error.

By adjusting the valve operation of a subsequent cylinder cycle, it is possible to reduce potential errors in delivered valve timing or lift. In other words, in one example, the error can be learned for the condition under which it occurred, and then used the next time the engine operates at or near that condition so that the error can be reduced. In this way, improved accuracy can be achieved.

An advantage of the above aspect is that there is potential for improved air-fuel ratio control, torque control, emissions, etc.

Also note that the code can be in the form of machine instructions to carry out the corresponding code.

BRIEF DESCRIPTION OF THE FIGURES

The above features, and advantages will be readily apparent from the following detailed description of an example embodiment of the invention, or from the accompanying drawings.

FIG. 2A shows a schematic vertical cross-sectional view of an apparatus for controlling valve actuation, with the valve in the fully closed position;

FIG. 2B shows a schematic vertical cross-sectional view of an apparatus for controlling valve actuation as shown in FIG. 1, with the valve in the fully open position;

DETAILED DESCRIPTION OF EXAMPLE EMBODIMENT(S) OF THE INVENTION

Figure 1:
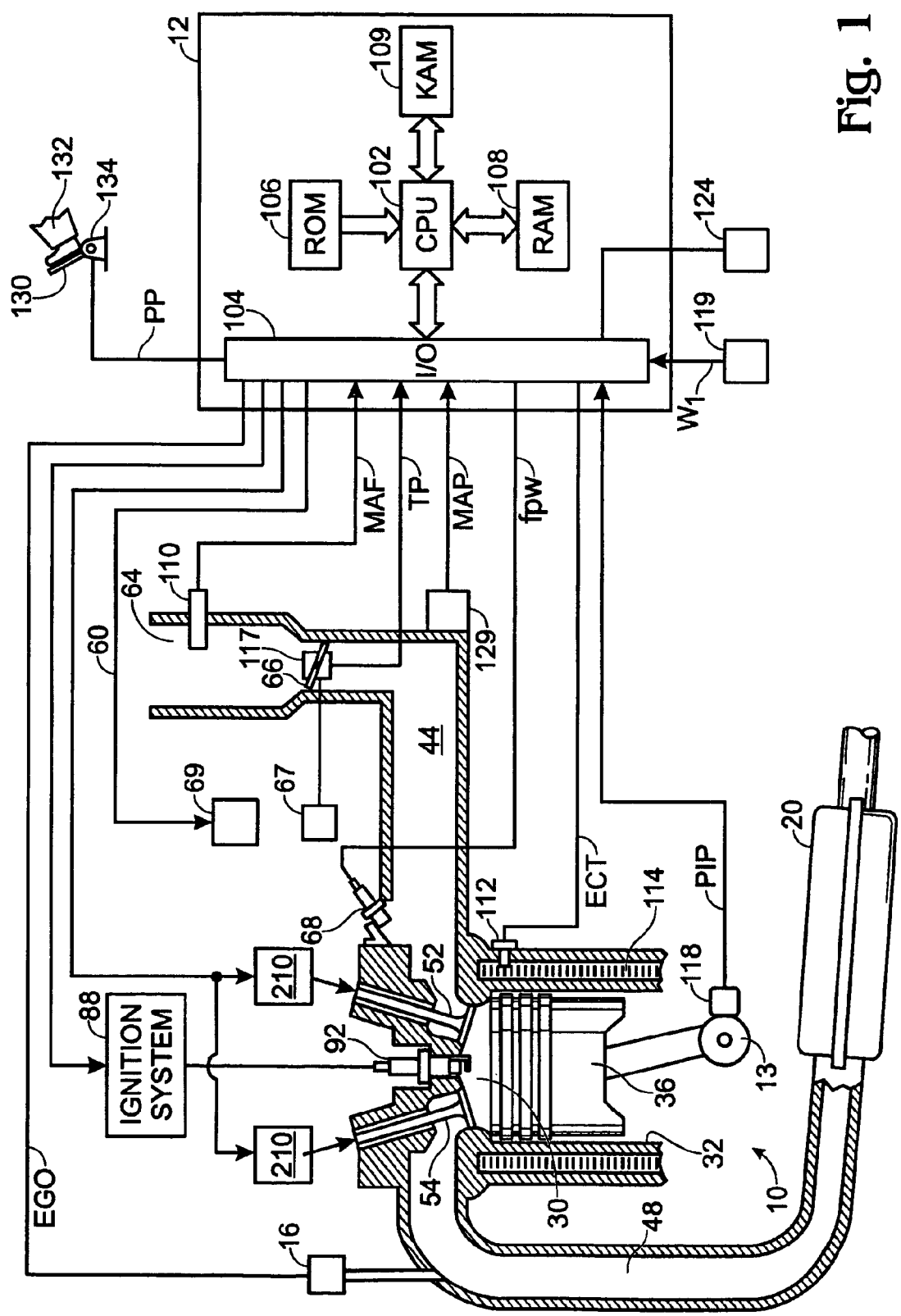
FIG. 1 is a block diagram of an engine illustrating various components related to the present invention.

Referring to FIG. 1, internal combustion engine 10 is shown. Engine 10 can be an engine of a passenger vehicle or truck driven on roads by drivers. Although not shown, Engine 10 can be coupled into a powertrain system of the vehicle. The powertrain can include a torque converter coupled to the engine 10 via a crankshaft. The torque converter can also be coupled to an automatic transmission via a turbine shaft. The torque converter can have a bypass clutch which can be engaged, disengaged, or partially engaged. When the clutch is either disengaged or partially engaged, the torque converter is said to be in an unlocked state. The turbine shaft is also known as transmission input shaft. The transmission can comprise an electronically controlled transmission with a plurality of selectable discrete gear ratios. The transmission can also comprise various other gears such as, for example, a final drive ratio. The transmission can also be coupled to tires via an axle. The tires interface the vehicle to the road.

Internal combustion engine 10 comprising a plurality of cylinders, one cylinder of which, shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry.

As described more fully below with regard to FIGS. 2A and 2B, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded, or if vacuum is desired to operate accessories or reduce induction related noise.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular examples random access memory 108, and a conventional data bus. Further, keep alive memory (KAM) 109 is shown communicating with the CPU 102.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of the turbine shaft (output of a torque converter, if equipped), and a profile ignition pickup signal (PIP) from Hall effect sensor 118 coupled to crankshaft 13 indicating an engine speed (N) and position. Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle plate is not used, an air bypass valve (not shown) can be installed to allow a controlled amount of air to bypass throttle plate 62. In this alternative embodiment, the air bypass valve (not shown) receives a control signal (not shown) from controller 12.

Referring to FIGS. 2A and 2B, an apparatus 210 is shown for controlling movement of a valve 212 in camless engine 10 between a fully closed position (shown in FIG. 2A), and a fully open position (shown in FIG. 2B). The valve 212 can be either or both of intake and exhaust valves 52 and 54 of FIG. 1. Also, if more than one intake and/or exhaust valve are used, such as in a 3-valve, or 4-valve engine, some or all of the valves can be electronically actuated as shown in FIG. 2.

The apparatus 210 includes an electromagnetic valve actuator (EVA) 214 with upper and lower coils 216, 218 which electromagnetically drive an armature 220 against the force of upper and lower springs 222, 224 for controlling movement of the valve 212.

Switch-type position sensors 228, 230, and 232 are provided and installed so that they switch when the armature 220 crosses the sensor location. It is anticipated that switch-type position sensors can be easily manufactured based on optical technology (e.g., LEDs and photo elements) and when combined with appropriate asynchronous circuitry they would yield a signal with the rising edge when the armature crosses the sensor location. It is furthermore anticipated that these sensors would result in cost reduction as compared to continuous position sensors, and would be reliable.

Controller 234 (which can be combined into controller 12i, or act as a separate controller) is operatively connected to the position sensors 228, 230, and 232, and to the upper and lower coils 216, 218 in order to control actuation and landing of the valve 212.

The first position sensor 228 is located around the middle position between the coils 216, 218, the second sensor 230 is located close to the lower coil 218, and the third sensor 232 is located close to the upper coil 216. In addition, controller 234 receives information from other sensor, such as the crank angle from sensor 118, as discussed more fully below.

Figure 3:
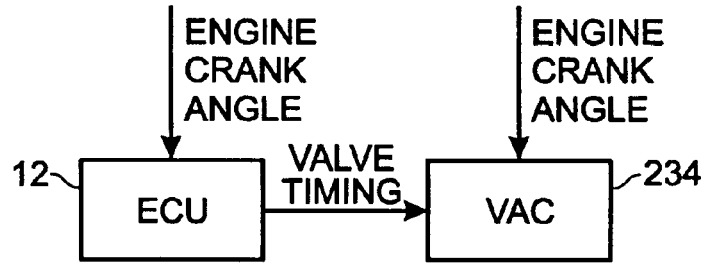
FIG. 3 is a block diagram illustrating communication between example controller.

Due to the electronic control used above, it is possible to independently actuate intake valves operating in an internal combustion engine. This allows increased flexibility to directly control individual cylinder charge characteristics to yield desired torque and emissions output from the engine at various operating modes including variable displacement and variable stroke modes. As indicated above, the electronically actuated valve system can independently actuate the valves, or groups of valves, in the valvetrain to desired valve timings that are computed in an engine control unit (ECU) 12 and delivered to a valve actuation unit (VAC) 234 to be processed as shown below, in the example configuration of FIG. 3. In addition, desired valve lift can also be included. Further, the desired valve timings can be desired valve opening timing, desired valve closing timing, desired valve opening duration, desired valve overlap, or various others.

Specifically, the VAC 234, which includes a timing to actuation controller (TAC) and the appropriate hardware and electronics to actuate the valves in the valvetrain as shown above in FIG. 2, takes valve timing information and controls the actuation of the valvetrain. A mechanism to measure the delivered valve timing is shown in FIG. 2 to be position sensors, and this information is provided to the engine system. This information can come from various sensors/ systems, such as a direct position sensor (hall effect, LVDT, optical, etc.) or inferred position sensing based on valve actuator current (electronic actuation) or pressure (hydraulic actuation) feedback. The actual timing (delivered timing as measured) is then available, although in some cases not for the controlling the specific valve event during which the measurement is made, during the operation of the engine and valvetrain. As illustrated below, this information is used to correct the control of later valve events to provide accurate valve opening and/or lift control.

Figure 4:
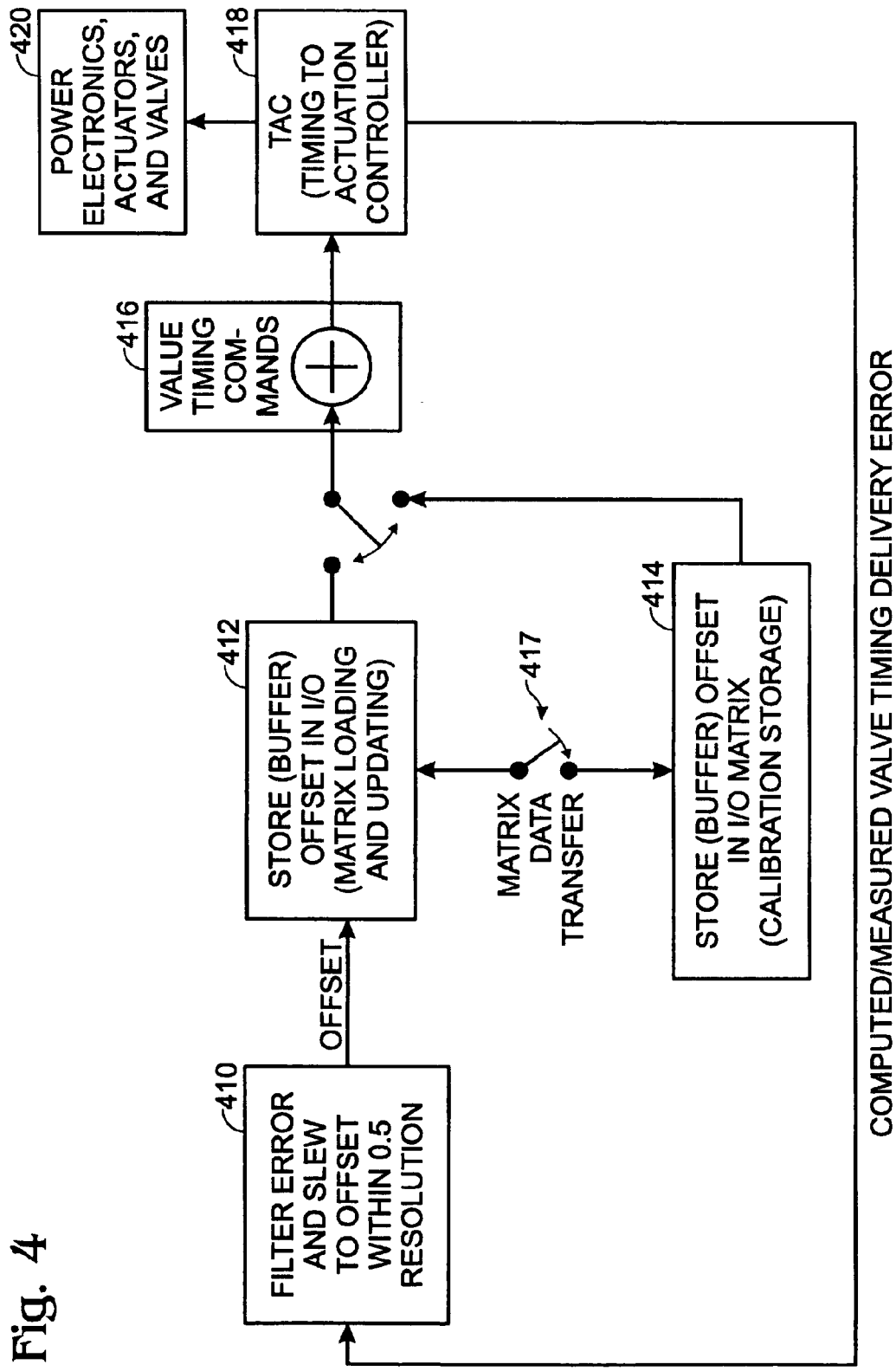
FIG. 4 is a diagram of a control routine.

Referring now to FIG. 4, a routine is described based on a block diagram. The individual blocks and their respective interfaces are detailed as well as options on the integration of the scheme into the operation of the vehicle system.

As will be appreciated by one of ordinary skill in the art, the specific routines described below in the diagrams may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12, or controller 234, or combinations thereof.

Block 410 inputs inferred (computed) or directly measured delivery error timing, $e_{vt}(k)$, and applies a filter and gain (representative integral controller) and outputs a computed offset, offset(k). The following equation 1 is an example discrete transfer function between error and the output portion.

$$\text{offset}(k) = \alpha * \text{offset}(k-1) + (1-\alpha) * e_{vt}(k)$$

$$0 \leq \alpha \leq 1 \quad \text{equation 1.}$$

The output of block 410, offset(k), is provided to block 412. Block 412 reads the offsets, as well as current engine speed and desired valve timing data. The desired valve timing can be based on desired engine torque, desired airflow, or various other parameters, such as engine speed error during idle speed control. Note that the diagram of FIG. 4 stores error data as a function of engine speed and desired valve timing, however could be indexed as a function of engine airflow, time since start, valve/engine temperature, fuel injection amount, and/or crank angle. Further, it can be indexed as a function of the number of engine events from an engine start and engine coolant temperature. In this way, it is possible to assign the error measurements to the conditions to which they correlate.

Figure 5:
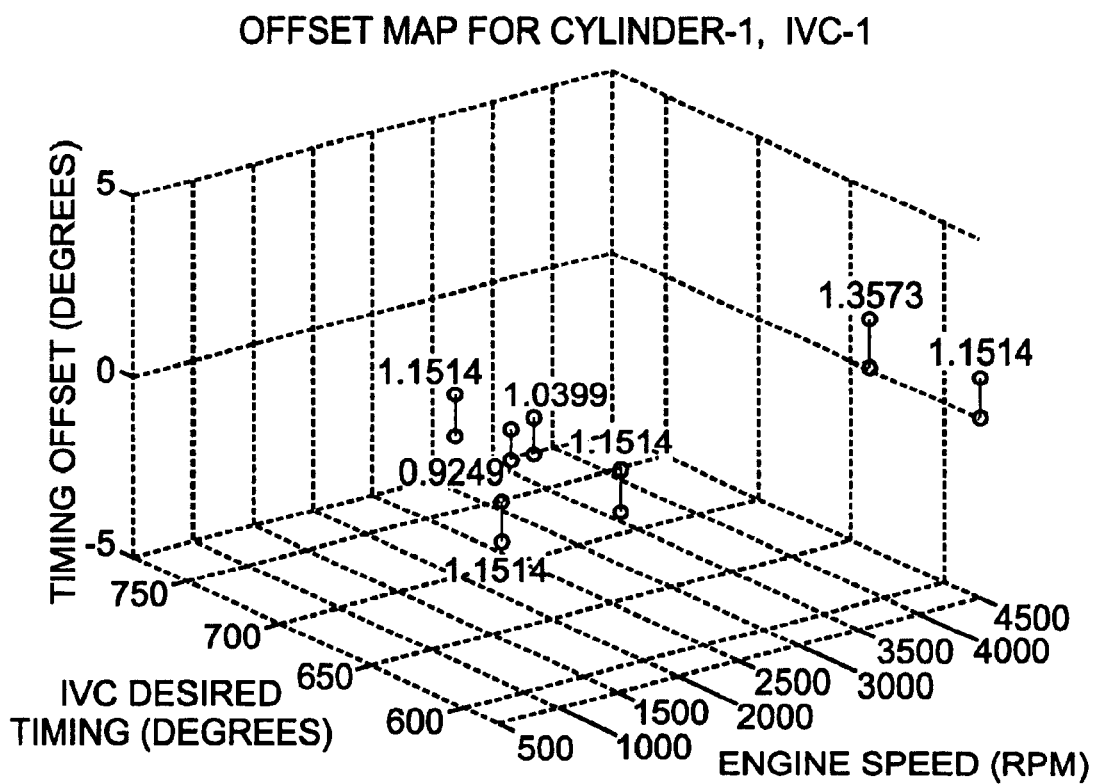
FIG. 5 is a graph illustrating error data indexed as a function of operating conditions.

Block 412 uses a storage matrix or pointer to ECU memory in which and n-by-m matrix or 3-dimensional table data can be stored. The engine speed and desired valve timing (or engine, load) are utilized as the x and y-axis (table) or row and column (matrix) information respectively. The offset, offset(k), then represents the z-axis (in terms of a table) or matrix data. The data can be displayed in terms of a 2-dimensional graph. A representative example is shown in FIG. 5.

Returning to FIG. 4, the diagram also shows two outputs from block 412. The outputs are shown as connections which can be selectively enabled to allow data flow to occur to either, both, or neither of blocks 414 and 416. In one example, the matrix (or table) data is not modified in this block and is output in the same configuration as it is entered. Indexing to input into the matrix (table) is independent of indexing to output from the matrix (table).

The matrix in block 412 can be dynamically updated as the engine operates through various speed and load regions. The output path to block 414, through the matrix data transfer switch 417, is activated during transfer (periodic or via triggering condition discussed below) of matrix (table) indexing and data to a secondary storage matrix (table) in block 414. In other words, the data transfer can be periodic, such as every sample time of the controller. Alternatively, the data transfer can be at preselected engine revolutions. The update can also be triggered by selected operating conditions, such as when the error values determined are greater than a threshold value. As discussed below, the error value threshold can also be variable depending on engine speed and desired valve timing.

The output path to block 416 is activated during calibration of the engine and during some non-transient conditions of the engine (discussed below).

Block 414 contains generally the same functionality as is contained in block 412. The input to the block is from the data storage in block 412. This is a 2-way channel and the data can flow from block 414 to block 412. In this example, the data to/from block 412 is mapped directly from/to block 414 without modification upon activation of the matrix data transfer switch. The output contains the matrix (table) data indexed to the current operating engine speed and desired valve timing which is transferred to block 416 during engine operation with the exception of calibration. The matrix in block 414 can be static, stored in keep alive memory (KAM) which is not lost during key off conditions. The matrix is also updated at various times (periodic or via triggering condition discussed below).

Block 416 takes in the offset data output from the matrix (table) of either block 412 or 414 indexed to the current engine speed and desired valve timing, $t_{des}(k)$, values and subtracts it from the commanded desired timing value as shown in equation 2. In one example, this is same desired value which is used to output index the matrix (table) from block 412 and 414. The resulting new timing value, $t_{new}(k)$, is then delivered to block 418 where it is converted to commands for valve actuation through block 420.

$$t_{new}(k) = t_{des}(k) - \beta * \text{offset}(k)$$

$$0 < \beta \leq 1 \quad \text{equation 2.}$$

Block 418 delivers the new timing, $t_{new}(k)$, and provides a measurement of the actual delivered timing, $t_{del}(k)$, which is used to compute the new timing error as shown by equation 3.

$$e_{vt}(k+1) = t_{del}(k) - t_{new}(k) \quad \text{equation 3.}$$

Block 420 contains the power electronics and valve actuation hardware which take the commands from block 418 and generates the valve actuation.

Returning to block 414, determination of the offset accuracy is described. The accuracy of the stored offset information from the matrices of block 414 is determined through comparison with a timing error constraint. The satisfaction of the constraint can be used as a trigger mechanism, trigger(k), for the different operating modes of the method. The constraint can be derived in various ways, two examples of which are given below.

1) Infinity norm error: In this approach, the timing error values are designated as, $e_{vt}^{s,t}(k)$, where s and t are the engine speed and desired valve timing indices. The error value can be compared to a constraint matrix C as shown in equation 4.

$$\text{trigger}(k) = 1; \quad |e_{vt}^{s,t}(k)| > C^{s,t}$$

$$\text{trigger}(k) = 0; \text{ otherwise} \quad \text{equation 4.}$$

As such, a trigger is used to indicate when the absolute value of the measured error is greater than a threshold value. In particular, in this example, various threshold values are used depending on the operating conditions at which the error was measured.

Note that in the case where there are multiple learning matrices (tables) for valve opening, valve closing, for example, the trigger can be individual to each learning loop, or a combined trigger used to enable learning for both loops. In this later case, the error value can be a combined error from the two loops. Note that there can also be multiple loops, such as one for each cylinder. Again, separate or combined triggers can be used.

2) Mean squared error: In this alternative approach, the timing error values, $e_{vt}^{s,t}(k)$, where s and t are the engine speed and desired valve timing indices, can be compared to a constraint C as shown in equation 5.

$$\text{trigger}(k) = 1; \quad \frac{1}{(s*t)} * \sum_{s,t} |e_{vt}^{s,t}(k)|^2 > C \quad \text{equation 5}$$

$$\text{trigger}(k) = 0; \quad \text{otherwise.}$$

In this case, the error is not simply compared to a threshold valve to trigger updating the learned error, but the mean squared error value is used.

In an alternative embodiment, the approaches above can be used to correct for valve lift errors. In such a case, discrete sensors along the vertical axis of the actuator can be used to provide measurement/lift feedback.

To illustrate implementation of the above method in a generic way, a configuration is described with a generic maximum number of cylinders (designated as a P-Cylinder engine) (e.g., for a V-8 engine, P). The engine is also designated to have F intake valves and G exhaust valves, all operating independently in this example. This configuration can have up to (F+G)*P*2 independent feedback loop methodologies diagramed as in FIG. 4 simultaneously operating, if desired.

Further, each valve has an opening and closing timing associated with its operation. If both are provided with adaptive learning as shown in FIG. 4, the system then has (F+G)*P*4 matrices (tables) for offset data storage. As such, to reduce the amount of memory storage, the smallest matrix dimensions and discretization are determined and utilized to allow accurate timing offset storage over all engine-operating conditions while utilizing the lowest amount of memory storage. These dimensions are engine configuration specific and can be determined through experimentation, for example.

The operation of the routine in FIG. 4 is now described for both open loop and closed loop operation. During open loop operation, the matrix data transfer switch 417 is closed and the switch connecting blocks 414 and 416 is closed. In this mode of operation, the offset data is accessed directly from block 414. The data from block 414 is also transferred to block 412. The conditions for enabling this mode of operation are set forth below in equation 6, where v(k)=engine speed, Δt=step time.

$$\text{trigger}(k) = 0$$

OR $$\{\text{trigger}(k) = 1\} \& \left\{ \frac{v(k) - v(k-1)}{\Delta t} > transient_{\max} \right\}. \quad \text{equation 6}$$

During closed loop operation, the matrix data transfer 417 switch is closed. The switch connecting blocks 412 and 416 is also closed. In this mode of operation, the offset data is accessed directly from block 412. The data from block 412 is also transferred to block 414. The conditions for enabling this mode of operation are set forth below in equation 7, where v(k)=engine speed, Δt=step time.

$$\{trigger(k) = 1\} \& \left\{ \frac{v(k) - v(k-1)}{\Delta t} \leq transient_{\max} \right\}. \quad \text{equation 7}$$

For Closed Loop Operation during calibration, the matrix data transfer switch 417 is open. The switch connecting blocks 412 and 416 is closed. In this mode of operation, the offset data is accessed directly from block 412 but the block 414 matrix data is not updated. This mode is used for calibration.

For upload operation, the matrix data transfer switch 417 is open and the data from block 414 matrices are transferredito the block 412 matrices. This mode is used during engine start.

For vehicle calibration of block 414, various approaches, can be used. In one approach, the engine is run through various speed/load combinations through pedal input via chassis rolls in closed loop operation (type 1 mode). This will populate the block 412 and block 414 matrices concurrently for all valves. As indicated above, different modes can be used depending on vehicle operation. Examples now are described as to when different modes are appropriate. During engine starting, the upload operation is executed to transfer all data from block 414 storage to block 412 matrices. Then, the appropriate mode is selected as described above. Also, during engine shutdown conditions, the open loop operation is utilized since error learning may be inaccurate. In this way, accurate adaptive learning can be achieved to improve valve control.

This concludes the description of the invention. The reading of it by those skilled in the art would bring to mind many alterations and modifications without departing from the spirit and the scope of the invention. Accordingly, it is intended that the scope of the invention be defined by the following claims.

We claim:

1. A system comprising:
   an electrically actuated valve of an internal combustion engine;
   a computer storage medium having instructions encoded therein for controlling said electrically actuated valve, said medium comprising:
   code for determining a desired valve condition for a cylinder cycle;
   code for determining an actual valve condition occurring during said cylinder cycle;
   code for determining an error between said desired valve condition and said actual valve condition for said cylinder cycle; code for triggering said determination of said error during preselected conditions, wherein said triggering code conditions include whether said determined error is greater than a threshold, wherein said threshold varies as a function of engine operating conditions; and
   code for adjusting a desired valve condition of a subsequent cylinder cycle based on said determined error.

2. The system of claim 1 further comprising code filtering said determined error.

3. The system of claim 1 wherein said desired valve condition is a desired valve timing.

4. The system of claim 3 wherein said threshold varies as a function of engine speed.

5. The system of claim 4 wherein said threshold further varies as a function of desired valve timing.

6. The system of claim 5 wherein said desired valve timing is a desired valve opening timing, and said threshold varies with said desired valve opening timing.

7. The system of claim 6 wherein said desired valve timing is a desired valve closing timing, and said threshold varies with said desired valve opening timing.

8. The system of claim 6 wherein said determined error is stored in keep alive memory.

9. A system comprising:
   an electrically actuated valve of an internal combustion engine;
   a computer storage medium having instructions encoded therein for controlling said electrically actuated valve, said medium comprising:
   code for determining a desired valve condition for a cylinder cycle;
   code for determining an actual valve condition occurring during said cylinder cycle;
   code for determining an error between said desired valve condition and said actual valve condition for said cylinder cycle;
   code for adjusting a desired valve condition of a subsequent cylinder cycle based on said determined error; and
   code for storing said error as a function of engine coolant temperature.

10. The system of claim 9 further comprising code for storing said error as a function of time since engine start.

11. The system of claim 1 further comprising code for storing said error as a function of a number of engine events from a start of the engine.

12. A system comprising:
a computer storage medium having instructions encoded therein for controlling electric valve actuation of an internal combustion engine, said medium comprising:
code for determining a desired valve condition;
code for reading a sensor measuring said valve conditions;
code for determining an error between said desired valve condition and said measured valve condition; and
code for storing said determined error in keep alive memory as a function of at least engine coolant temperature, wherein said determined error is used to adjust said desired valve condition.

13. The system of claim 12 further comprising code filtering said determined error.

14. The system of claim 12 further comprising code for triggering said determination of said error during preselected conditions.

15. The system of claim 14 wherein said triggering code conditions include whether said determined error is greater than a threshold.

16. The system of claim 15 wherein said threshold varies as a function of engine operating conditions.

17. A system comprising:
an electrically actuated valve of an internal combustion engine;
a computer storage medium having instructions encoded therein for controlling said electrically actuated valve, said medium comprising:
code for determining a desired valve opening and closing timing for a cylinder cycle;
code for determining an actual valve opening and closing timing occurring during said cylinder cycle;
code for determining a first error between said desired valve opening timing and said actual valve opening timing and a second error between said desired valve closing timing and said actual valve closing timing for said cylinder cycle;
code for adjusting a desired valve opening timing and a desired valve closing timing of a subsequent cylinder cycle based on said first and second determined errors; and
storing said first error as a function of desired valve opening timing and temperature, and storing said second error as a function of desired valve closing timing and temperature.

18. The system of claim 17 further comprising code for triggering said determination of said first and second error during preselected conditions.

19. The system of claim 18 wherein said triggering code conditions include whether a combination of said determined first and second error is greater than a threshold.

* * * * *